Aug. 19, 1952  W. A. JOHNSON  2,607,894
AERIAL SYSTEM

Filed Feb. 21, 1949  2 SHEETS—SHEET 1

WILLIAM ARTHUR JOHNSON
Inventor
By Moore + Hall
Attorneys

Aug. 19, 1952 W. A. JOHNSON 2,607,894
AERIAL SYSTEM
Filed Feb. 21, 1949 2 SHEETS—SHEET 2

WILLIAM ARTHUR JOHNSON
Inventor
By Moore
& Hall
Attorneys

Patented Aug. 19, 1952

2,607,894

UNITED STATES PATENT OFFICE 2,607,894

AERIAL SYSTEM

William Arthur Johnson, Farnborough, England

Application February 21, 1949, Serial No. 77,629
In Great Britain February 24, 1948

15 Claims. (Cl. 250—33)

This invention relates to suppressed or dragless aerial systems for aircraft.

In the specification accompanying my copending United States patent application Serial No. 764,098 now U. S. Patent 2,510,693 granted June 6, 1950 and entitled "Radio Aerial, Particularly for Aircraft and Other Vehicles" means are described for supplying radio frequency energy to or taking radio frequency energy from a metallic wing fuselage or like aircraft structure capable of functioning as a unipole or dipole aerial comprising a coupling coil arranged in or adjacent the structure in such a manner that the magnetic field of the coil is substantially coincident with that of the structure used as a unipole or dipole. There is thus provided an aerial system which is incorporated as part of the aircraft structure.

The present invention is concerned with improvements in the disposition of the coupling coil of the above described aerial system.

According to the invention, the coupling coil is located within a metallic channel in and/or on the metal structure it excites.

As described in the aforesaid specification the coil itself may only partly encircle the structure, in which case the channel may be no longer than the coil, or the coil may take the form of a toroid and completely encircle the structure, in which case the channel may be longitudinally continuous and approximate to an endless groove.

The channel is defined above as being in and/or on the structure since it may be contained within the profile of the excited structure or may be formed by a member wholly or in part outside the profile of said structure.

Since the invention relates to suppressed or dragless aerial systems it may be undesirable to employ a channel construction forming a substantial excrescence upon the aerodynamic profile, but it is a feature of the invention to adapt the usual fairings at the junction of one structural part to another, such as the fairing around a wing root where the wing joins the fuselage, as a channel member for containing the coupling coil of the invention.

Although the coil may be located in a simple open channel, it is preferred that the channel should have only a slit-like opening and be enlarged, as necessary, behind the slit to accommodate the coil. It will be understood, however, that the opening into the channel need be an opening only in the sense that it is a discontinuity in the metal structure in respect of electrical conductivity and may be closed by electrical insulating material to complete the surface aerodynamically.

In order to enable the invention to be more readily understood reference is directed to the accompanying drawings in which—

Referring to the diagrams in Figures 1 to 4 the thick lines are intended to represent in section the skins 1 of various aircraft structures, such as wings, excited by coils represented in transverse section by the circles 2. The thin lines 3 running parallel with the thick lines represent the radio frequency surface currents in the skin 1.

Figure 1:
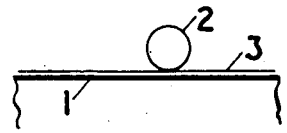
Figures 1–4 are diagrams illustrating the principles of the invention.

Figure 1 shows the coil 2 which may be of any length from a single turn to a complete toroid encircling the structure, located outside the general contour of the skin 1 such that its magnetic field tends to encircle the structure and substantially coincide with the magnetic field of the structure when excited as though the whole structure were a dipole.

Figure 2:
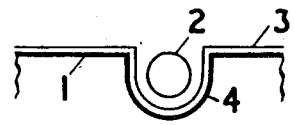
Figure 3:
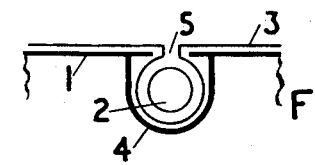
Figure 4:
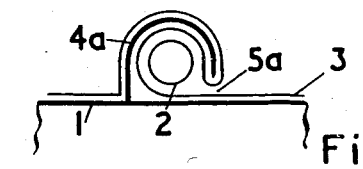

Figure 2 shows how, in accordance with the present invention, by placing the coil in a channel 4 in the skin 1 the radio frequency current 3 is caused partly to encircle the axis of the coil and thereby effect a closer linkage with the magnetic field of the coil. Figure 3 shows how the effect can still be obtained by closing the channel all but for a narrow slit 5 and Figure 4 shows how a similar effect electrically can be obtained by enclosing an externally placed coil within a channel raised from the suface of the skin 1.

Figure 5:
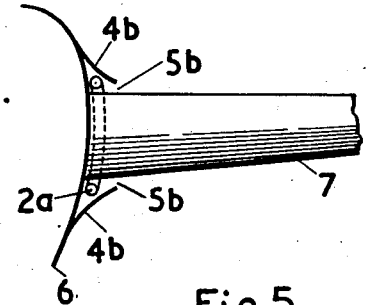
Figure 5 is a diagrammatic vertical cross-section on the line of the main wing spar of an aircraft showing existing fairings adapted for the purposes of the invention.

An example of a practical embodiment of the invention is illustrated diagrammatically in Figure 5. The fuselage of an aircraft is represented at 6 and the wing at 7. A curved fairing 4b which serves to smooth-off the abrupt join between the fuselage and the wing is modified by the insertion of insulation between the fairing and the wing so as electrically to provide a gap 5b therebetween. Within the triangular section channel formed by the fairing is the coupling coil 2a which in this instance is a toroid almost completely encircling the wing, the arrangement is suitable for receiving low radio frequencies and is obviously only suitable for use on particular aircraft having suitable fairings at the wing root.

Figure 6:
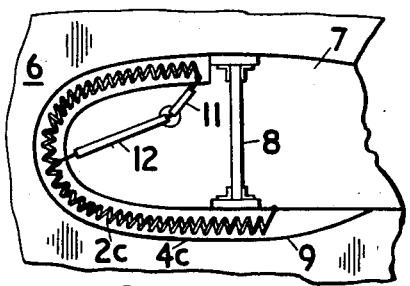
Figures 6 and 7 are diagrammatic cross sections in planes at right angles near the wing-root of an aircraft showing a coupling coil disposed in a channel in accordance with one practical embodiment of the invention suitable for operation at low or medium frequencies.
Figure 7:
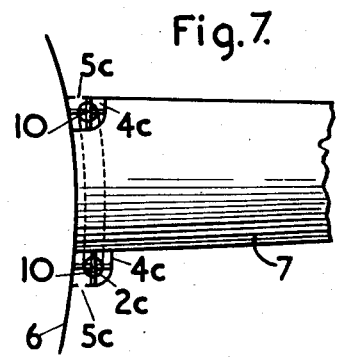
Figure 8:
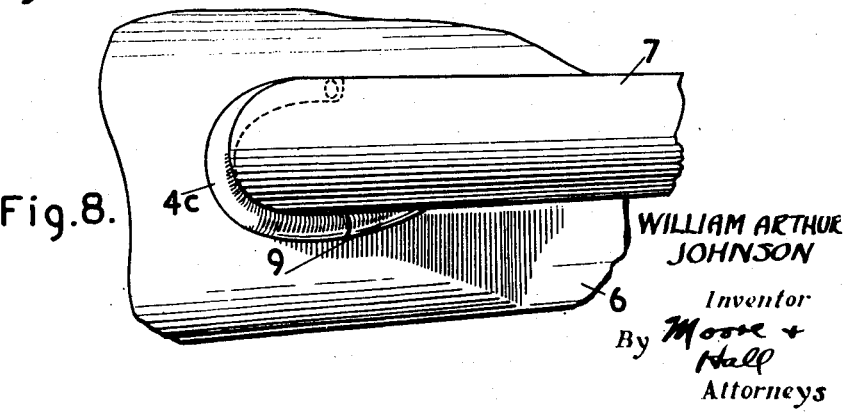
Fig. 8 is an external perspective view of the arrangement shown in Figures 6 and 7.

Another embodiment of the invention suitable for receiving at low or medium radio frequencies is shown in Figures 6-8. The coupling coil 2c consists of 300 five-inch diameter turns of 11 S. W. G. copper wire spaced five turns to the inch curved to conform more or less to the leading edge of one wing adjacent the fuselage. The main spar 8, seen in section in Figure 6, was too close to the leading edge in one particular aircraft to permit the construction of a fully recessed channel long enough to accommodate the coil around the leading edge. Hence the channel 4c is partly recessed but where it passes under the main spar the channel is formed wholly external to the skin as shown but is tailed-off by means of a coned shaped fairing 9. The channel 4c is constructed of moulded plastic material and covered, except where the gap 5c is required, with thin sheet metal. The coil 2c is wound upon a cruciform plastic former 10 (Figure 7) bent in the direction of its length to the required curvature.

The lower end of the coil is earthed and the top end connected by a co-axial cable 11 to a 2,000 micro-micro-farad variable condenser, shunted, if desired, by a 2,000 micro-micro-fared fixed condenser, housed just inside the fuselage. A further co-axial cable 12 connected to a centre tap on the coil passes into the fuselage and is connected to the input of a standard communications receiver. The arrangement operates satisfactorily over the band 100-250 kc./s. and by means of additional tappings on the coil and switch means to short circuit some of the turns and to reduce the capacity in circuit wave bands at higher medium frequencies up to about 1 mc./s. can be covered using the same coil.

Figure 9:
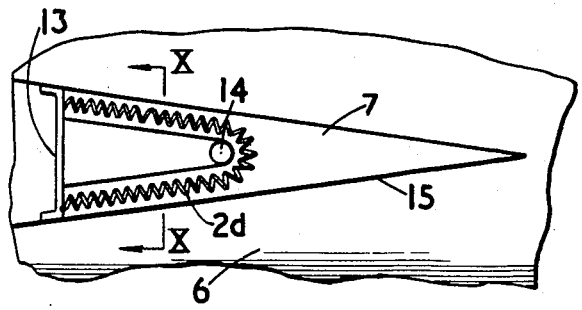
Figure 9 is a view similar to Figure 6 showing a coupling coil disposed at the trailing edge of an aircraft wing.
Figure 10:
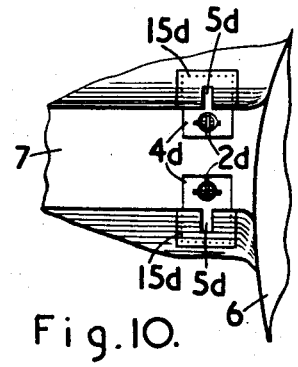
Figure 10 is a section on the line X—X of Figure 9.

A similar arrangement to that shown in Figures 6-8 but installed at the trailing edge of a wing is shown in Figures 9 and 10. A coil 2d similar to coil 2c of Figures 6-8 is contained in channel 4d recessed in the upper surface just rearward of a rear spar 13 and after passing around a flap control duct 14, returning on the undersurface to said spar 13. The channel 4d is constructed as an open channel and is closed by a plastic cover 15d covered with sheet metal all but for the narrow slit or gap 5d.

Figure 11:
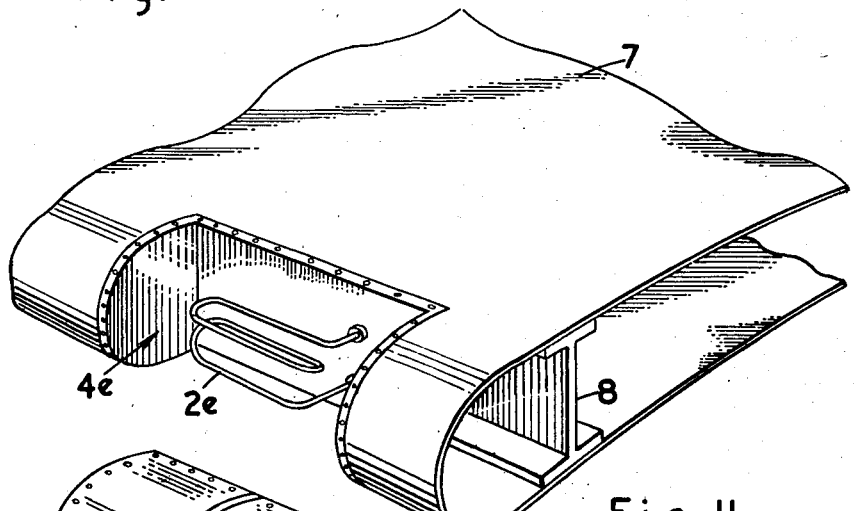
Figure 11 is an exploded perspective view of yet another practical embodiment of the invention, suitable for operation at high frequencies
Figure 12:
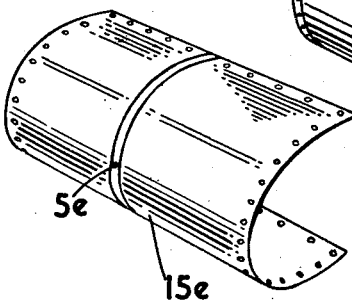
Figure 12 is a diagrammatic plan section of Figure 9.
Figure 12:
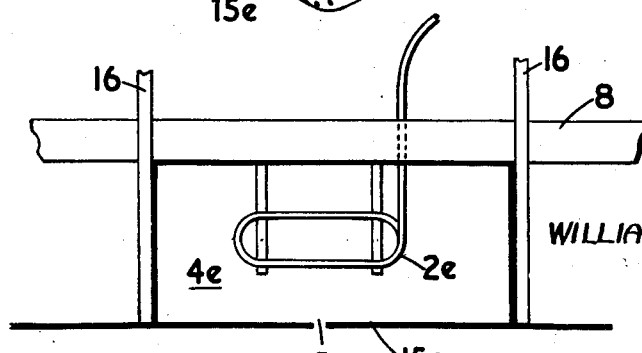

Referring now to Figures 11 and 12, the coupling coil 2e consists of 2 turns only and is suitable for reception at high radio frequencies (over 2 mc./s.). It has been found that much higher efficiencies are obtainable when the wing span exceeds one-fifth of a wavelength—so much so that an aerial in accordance with this embodiment of the invention may be used for transmitting purposes as well as for reception. The coil 2e is contained in a channel 4e at the leading edge of the wing 7 between two stringers 16. The channel is closed by a plastic insulating cover 15e which is preferably covered with sheet metal or sprayed with metal to leave a narrow non-metallic gap 5e as in the above described arrangements. The horizontal plan section Figure 12 shows how there is thus produced a channel with a narrow opening similar to Figure 3.

The coil or loop 2e of Figures 11 and 12 is constructed of approximately ½-in. diameter tubing and each loop is about 12 inches long by 4 inches wide. It is connected directly (by a continuation of the tubing) to a toroidal transformer and to a matching section adjusted by a variable condenser whereby the aerial arrangement is matched reasonably well to a 45 ohm line for frequencies from 8 to 20 mc./s. By employing a similar coil but with 4 turns the range 2-8 mc./s. has been covered.

It is to be understood that although the channel 4b—e is shown and described in connection with the above described embodiments as having continuous bottom and side walls in the manner of a trough, this need not necessarily be so in practice. It has been found that so long as there are metallic structural or other parts through which the surface currents interrupted by the gap 5b—e can pass around behind the coil then the arrangement functions satisfactorily. For example, in Figure 11 neither the sides nor the bottom of the channel 4e need necessarily be completely closed in as shown since the main spar 8 would function perfectly well as the bottom of the cavity and the stringers 16 as the side walls irrespective of their probable open lattice construction.

I claim:

1. A radio system for metal aircraft utilizing a portion of the aircraft as a radio frequency radiating antenna, said aircraft having salient part thereof of greater length than it has width or thickness, said salient part defining a slot adjacent the connection between said salient part and the main body of the aircraft, said slot extending at least part way about said salient part in a plane that is at an angle to the long dimension of said salient part, and a radio frequency coupling element located in said slot for inducing currents in said salient part, said coupling element comprising a coil whose axis is in a plane perpendicular to the long dimension of said salient part.

2. The radio system of claim 1 in which said salient part is a wing.

3. The radio system of claim 1 in which said slot is closed by electrical insulating material whereby said salient part is aerodynamically complete.

4. The radio system of claim 1 in which said coil is supported by a member within said slot.

5. In an aircraft radio system, an aircraft having an elongated metallic aerodynamic salient part having greater length than it has width or thickness, said salient part defining a slot therein extending in a plane perpendicular to the long dimension of said part, radio frequency means inside of said part and extending adjacent said slot for inducing a radio frequency current in said part in a direction perpendicular to said slot, and a U-shaped conductor extending around said radio frequency means, the upper ends of said U-shaped member being respectively connected adjacent the opposite edges of said slot.

6. The radio system of claim 5 in which said slot is adjacent the connection of the said salient part with the remainder of the aircraft.

7. The radio system of claim 5 in which said slot is aerodynamically closed by an electrical insulating material.

8. The system of claim 5 in which said salient part is a wing.

9. A radio system for aircraft utilizing a metal-surfaced portion of the aircraft as a radio frequency antenna, said aircraft having a salient part thereof of greater length than it has width or thickness, said salient part defining a channel-shaped slot extending at least part way about the same in a plane that is at an angle to the long dimension of the salient part, a coil located in the slot, the axis of the coil lying in a plane substantially perpendicular to the long dimension of the salient part.

10. The radio system of claim 9 in which the slot is adjacent the connection between the said salient part and the main body of the aircraft.

11. The radio system of claim 10 in which the said salient part is a wing.

12. The radio system of claim 9 in which the slot is located in the leading edge near the root of a wing of the aircraft.

13. The radio system of claim 9 including a fairing of insulating material arranged to cover the said slot, the said fairing being partially coated with metal to render the electrical opening of the said slot narrower than the physical dimension of the slot itself.

14. A radio antenna system in which a metal-skinned wing of an aircraft is used as an antenna element comprising means coupling said wing magnetically to a radio equipment in the aircraft, said coupling means comprising a coil housed in an open metal channel formed around the leading edge at the root of said wing, the main spar of said wing comprising the bottom of said channel and adjacent stringers of said wing the sides of said channel, said open metal channel forming an electrical discontinuity in the skin of the said wing, thereby causing high frequency antenna currents longitudinal of the wing to circumvent the axis of the said coil in traversing the said channel.

15. A radio system for an aircraft utilizing a metal-surfaced portion of the aircraft as a radio frequency antenna, said aircraft having a salient part thereof of greater length than it has width or thickness, comprising a coil extending at least part way about the said salient part, the axis of the said coil lying in a plane substantially perpendicular to the long dimension of the said salient part, and a metal channel housing the said coil and defining an electrical opening running beside the said axis.

WILLIAM ARTHUR JOHNSON.

REFERENCES CITED

The following references are of record in the file of this patent:

UNITED STATES PATENTS

| Number | Name | Date |
|---|---|---|
| 1,942,594 | Edwards | Jan. 9, 1934 |
| 2,044,779 | Hanson | June 23, 1936 |
| 2,129,852 | Leib | Sept. 13, 1938 |
| 2,242,200 | Woods | May 13, 1941 |
| 2,279,130 | Bruce | Apr. 7, 1942 |
| 2,400,867 | Lindenblad | May 21, 1946 |
| 2,404,093 | Roberts | July 16, 1946 |
| 2,412,249 | Brown et al. | Dec. 10, 1946 |
| 2,414,266 | Lindenblad | Jan. 14, 1947 |
| 2,478,708 | Raiche | Aug. 9, 1949 |
| 2,518,843 | Wehner | Aug. 15, 1950 |